(12) United States Patent
Li et al.

(10) Patent No.: US 11,144,607 B2
(45) Date of Patent: *Oct. 12, 2021

(54) NETWORK SEARCH MAPPING AND EXECUTION

(71) Applicant: INTERNATIONAL BUSINESS MACHINES CORPORATION, Armonk, NY (US)

(72) Inventors: Ying Li, Mohegan Lake, NY (US); Anh Q. Lu, Austin, TX (US); Jian Lu, Ningbo (CN); Chuan Y. Wang, Ningbo (CN); Jie Wang, Ningbo (CN); Wei Yan, Ningbo (CN)

(73) Assignee: International Business Machines Corporation, Armonk, NY (US)

( * ) Notice: Subject to any disclaimer, the term of this patent is extended or adjusted under 35 U.S.C. 154(b) by 80 days.

This patent is subject to a terminal disclaimer.

(21) Appl. No.: 16/738,043

(22) Filed: Jan. 9, 2020

(65) Prior Publication Data
US 2020/0142940 A1 May 7, 2020

Related U.S. Application Data

(63) Continuation of application No. 16/419,425, filed on May 22, 2019, now Pat. No. 10,565,277, which is a (Continued)

(51) Int. Cl.
*G06F 16/9535* (2019.01)
*G06F 16/22* (2019.01)
(Continued)

(52) U.S. Cl.
CPC ........ *G06F 16/9535* (2019.01); *G06F 3/0484* (2013.01); *G06F 16/22* (2019.01);
(Continued)

(58) Field of Classification Search
CPC .. G06F 3/0484; G06F 16/22; G06F 16/90332; G06F 16/951; G06F 16/9535;
(Continued)

(56) References Cited

U.S. PATENT DOCUMENTS 5,987,457 A  11/1999  Ballard
6,263,335 B1  7/2001  Paik et al.
(Continued)

OTHER PUBLICATIONS

Friedman, Mark J.; List of IBM Patents or Patent Applications Treated as Related; 1 page.

*Primary Examiner* — James E Richardson
(74) *Attorney, Agent, or Firm* — Schmeiser, Olsen & Watts; Nicholas L. Cadmus

(57) ABSTRACT

A method and system for improving a network search query is provided. The method includes receiving a natural language Internet search request and executing a real time search with respect to a database associated with an Internet based search for specified digital information. Categories associated with the natural language Internet search request are identified and associated intent information is received. Digital attributes data identified during the real time search are identified and an associated concept is extracted. The associated concept is mapped to the digital attributes and search based software code is generated and executed. Resulting relevant results are presented and the database is configured such that the relevant results are stored within a logical partition of the database.

13 Claims, 9 Drawing Sheets

Related U.S. Application Data continuation of application No. 15/625,614, filed on Jun. 16, 2017, now Pat. No. 10,380,211.

(51) Int. Cl.

| | | |
|---|---|---|
| *G06F 16/951* | (2019.01) | |
| *G06F 16/9032* | (2019.01) | |
| *G06F 40/30* | (2020.01) | |
| *G06F 3/0484* | (2013.01) | |

(52) U.S. Cl.
CPC ...... *G06F 16/90332* (2019.01); *G06F 16/951* (2019.01); *G06F 40/30* (2020.01)

(58) Field of Classification Search
CPC ............... G06F 40/30; G06F 17/30867; G06F 17/30312; G06F 17/2785
See application file for complete search history.

(56) References Cited

U.S. PATENT DOCUMENTS

| | | |
|---|---|---|
| 7,340,460 B1 | 3/2008 | Kapur |
| 7,788,251 B2 | 8/2010 | Carlson et al. |
| 8,732,198 B2 | 5/2014 | Chetuparambil et al. |
| 8,930,386 B2 | 1/2015 | Mayr et al. |
| 10,380,211 B2 | 8/2019 | Li |
| 2003/0217052 A1 | 11/2003 | Rubenczyk |
| 2004/0093321 A1 | 5/2004 | Roustant |
| 2005/0154713 A1 | 7/2005 | Glover |
| 2005/0203878 A1 | 9/2005 | Brill |
| 2006/0047701 A1 | 3/2006 | Maybury |
| 2006/0106793 A1 | 5/2006 | Liang |
| 2006/0167842 A1 | 7/2006 | Watson |
| 2006/0242130 A1 | 10/2006 | Sadri |
| 2007/0124263 A1 | 5/2007 | Katariya |
| 2010/0211588 A1 | 8/2010 | Jiang |
| 2011/0258202 A1 | 10/2011 | Mukherjee et al. |
| 2012/0226681 A1* | 9/2012 | Paparizos ......... G06F 16/24578 707/723 |
| 2015/0095202 A1 | 4/2015 | Subramanya et al. |
| 2015/0254247 A1 | 9/2015 | Bostick et al. |
| 2016/0063115 A1 | 3/2016 | Ayan |
| 2018/0189403 A1 | 7/2018 | Altaf |
| 2018/0357320 A1 | 12/2018 | Li |
| 2018/0365327 A1 | 12/2018 | Li |
| 2019/0272303 A1 | 9/2019 | Li |

* cited by examiner

NETWORK SEARCH MAPPING AND EXECUTION

CROSS REFERENCE TO RELATED APPLICATIONS

This application is a continuation application claiming priority to Ser. No. 16/419,425 filed May 22, 2019 which is a continuation application claiming priority to Ser. No. 15/625,614 filed Jun. 16, 2017 now U.S. Pat. No. 10,380,211 issued Aug. 13, 2019, the contents of which are hereby incorporated by reference.

FIELD

The present invention relates generally to a method for executing a network search query mapping process and in particular to a method and associated system for improving a real time search for digital information resulting in generation of modified search based software code for configuring a database structure.

BACKGROUND

Accurately associating information typically includes an inaccurate process with little flexibility. Generating systems and software for associating information may include a complicated process that may be time consuming and require a large amount of resources. Accordingly, there exists a need in the art to overcome at least some of the deficiencies and limitations described herein above.

SUMMARY

A first aspect of the invention provides a network search query improvement method comprising: receiving, by a processor of a hardware device from a user, a natural language Internet search request; executing, by the processor in response to the natural language Internet search request, a real time search with respect to a specialized database associated with an Internet based search for specified digital information; identifying, by the processor in response to the executing, categories associated with the natural language Internet search request; receiving, by the processor from the user, intent based information associated with the natural language Internet search request; automatically identifying, by the processor based on the intent based information, digital attributes of associated digital data identified during the real time search; extracting, by the processor from the associated digital data, a concept associated with the natural language Internet search request; identifying, by the processor in response to the extracting, a group of digital attributes of the digital attributes; mapping, by the processor, the concept to the group of digital attributes; storing within the specialized database, by the processor, the concept mapped to the group of digital attributes; generating, by the processor based on results of the concept mapped to the group of digital attributes, search based software code associated with an Internet search for the specified digital information; executing, by the processor in response to a user command, the search based software code; presenting, by the processor via a specialized graphical user interface, relevant results associated with the Internet based search for the specified digital information; and configuring, by the processor based on the relevant results, the specialized database such that the relevant results are stored within a logical partition of the specialized database, wherein the logical partition is enabled to execute multiple real time Internet searches for the specified digital information.

A second aspect of the invention provides a computer program product, comprising a computer readable hardware storage device storing a computer readable program code, the computer readable program code comprising an algorithm that when executed by a processor of a hardware device implements a network search query improvement method, the method comprising: receiving, by the processor, a natural language Internet search request; executing, by the processor in response to the natural language Internet search request, a real time search with respect to a specialized database associated with an Internet based search for specified digital information; identifying, by the processor in response to the executing, categories associated with the natural language Internet search request; receiving, by the processor from the user, intent based information associated with the natural language Internet search request automatically identifying, by the processor based on the intent based information, digital attributes of associated digital data identified during the real time search; extracting, by the processor from the associated digital data, a concept associated with the natural language Internet search request; identifying, by the processor in response to the extracting, a group of digital attributes of the digital attributes; mapping, by the processor, the concept to the group of digital attributes; storing within the specialized database, by the processor, the concept mapped to the group of digital attributes; generating, by the processor based on results of the concept mapped to the group of digital attributes, search based software code associated with an Internet search for the specified digital information; executing, by the processor in response to a user command, the search based software code; presenting, by the processor via a specialized graphical user interface, relevant results associated with the Internet based search for the specified digital information; and configuring, by the processor based on the relevant results, the specialized database such that the relevant results are stored within a logical partition of the specialized database, wherein the logical partition is enabled to execute multiple real time Internet searches for the specified digital information.

A third aspect of the invention provides a hardware device comprising a processor coupled to a computer-readable memory unit, the memory unit comprising instructions that when executed by the computer processor implements a network search query improvement method comprising: receiving, by the processor, a natural language Internet search request; executing, by the processor in response to the natural language Internet search request, a real time search with respect to a specialized database associated with an Internet based search for specified digital information; identifying, by the processor in response to the executing, categories associated with the natural language Internet search request; receiving, by the processor from the user, intent based information associated with the natural language Internet search request; automatically identifying, by the processor based on the intent based information, digital attributes of associated digital data identified during the real time search; extracting, by the processor from the associated digital data, a concept associated with the natural language Internet search request; identifying, by the processor in response to the extracting, a group of digital attributes of the digital attributes; mapping, by the processor, the concept to the group of digital attributes; storing within the specialized database, by the processor, the concept mapped to the group of digital attributes; generating, by the processor based on results of the concept mapped to the group of digital attributes, search based software code associated with an Internet search for the specified digital information; executing, by the processor in response to a user command, the search based software code; presenting, by the processor via a specialized graphical user interface, relevant results associated with the Internet based search for the specified digital information; and configuring, by the processor based on the relevant results, the specialized database such that the relevant results are stored within a logical partition of the specialized database, wherein the logical partition is enabled to execute multiple real time Internet searches for the specified digital information.

The present invention advantageously provides a simple method and associated system capable of accurately associating information.

DETAILED DESCRIPTION

Figure 1:
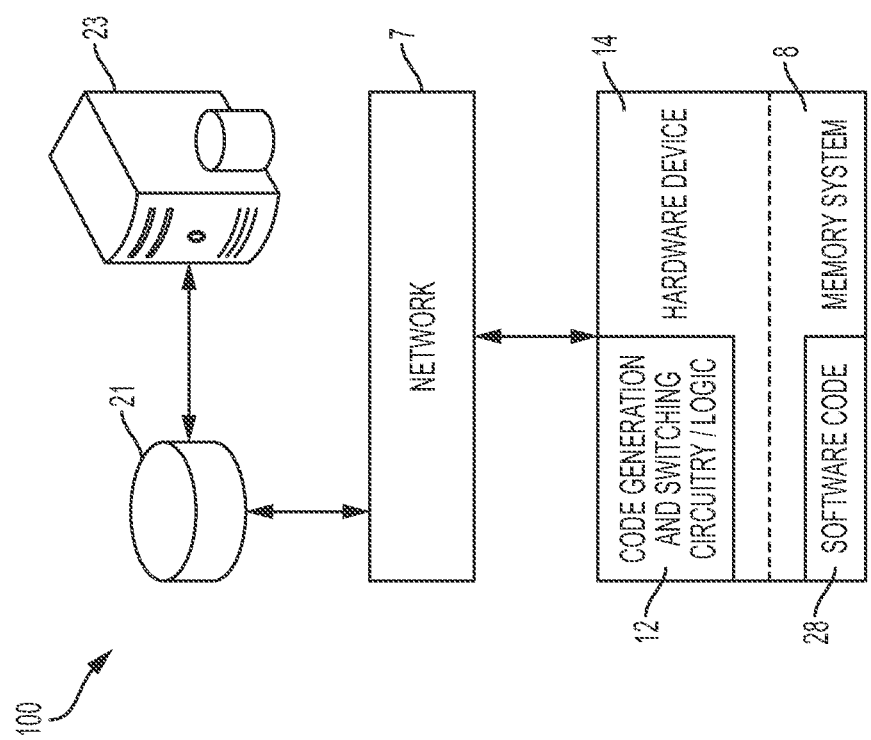
FIG. 1 illustrates a system for improving a real time self-learning database search for digital information resulting in generation of modified search based software code for configuring a database structure, in accordance with embodiments of the present invention.

FIG. 1 illustrates a system 100 for improving a real time self-learning database search for digital information resulting in generation of modified search based software code for configuring a database structure, in accordance with embodiments of the present invention. System 100 is enabled to extract concepts (e.g., keywords, text, etc.) from input(s) and map the extracted concepts to item search conditions (e.g., via key signature attributes, values, etc.) to improve the accuracy of a digital search. System 100 enables a process for improving a real time self-learning database search by:

1. Executing natural language processing (NLP) code for recognizing concepts and building search condition arrays and associated software code.
2. Analyzing input logs for identifying signature attributes for each concept to assist with a digital search and resulting recommendation.

System 100 enables a process for improving a self-learning real time search for extracting digital information and mapping the digital information to specified search conditions by:

1. Executing self-learning code to extract and map digital concepts to key attributes and values for generating accurate search conditions.
2. Executing natural language code for recognizing concepts and building search condition arrays.
3. Applying multi-variant analysis or Apriori association rule mining code for analyzing user input logs and identifying signature attributes for each concept. The signature attributes are associated with values for forming the search condition arrays.

System 100 enables a process for automatically learning semantics or interpretations of each high-level concept thereby:

1. Providing a shorter time for communications with respect to detailed intent.
2. Improving an accuracy of a real time search and associated recommendations.
3. Continuously refining concept mapping as input logs increase.

System 100 of FIG. 1 includes a database server 23 connected to a database system 21 connected through a network 7 to a hardware device 14. Hardware device 14 comprises code generation and switching circuitry/logic 12 and a memory system 8. Memory system 8 comprises generated software code 28. Server 23, database system 21, and hardware device 14 each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, database server 23, database system 21, and hardware device 14 may each comprise a specialized hardware device comprising specialized (non-generic) hardware and circuitry (i.e., specialized discrete non-generic analog, digital, and logic based circuitry) for (independently or in combination) executing a process described with respect to FIGS. 1-9. The specialized discrete non-generic analog, digital, and logic based circuitry (e.g., code generation circuitry/logic 15, etc.) may include proprietary specially designed components (e.g., a specialized integrated circuit, such as for example an Application Specific Integrated Circuit (ASIC) designed for only implementing an automated process for improving a real time search for digital information resulting in generation of modified search based software code for configuring a database structure. The memory system 8 may include a single memory system. Alternatively, the memory system 8 may include a plurality of memory systems. Network 7 may include any type of network including, inter alia, a local area network, (LAN), a wide area network (WAN), the Internet, a wireless network, etc.

Figure 2:
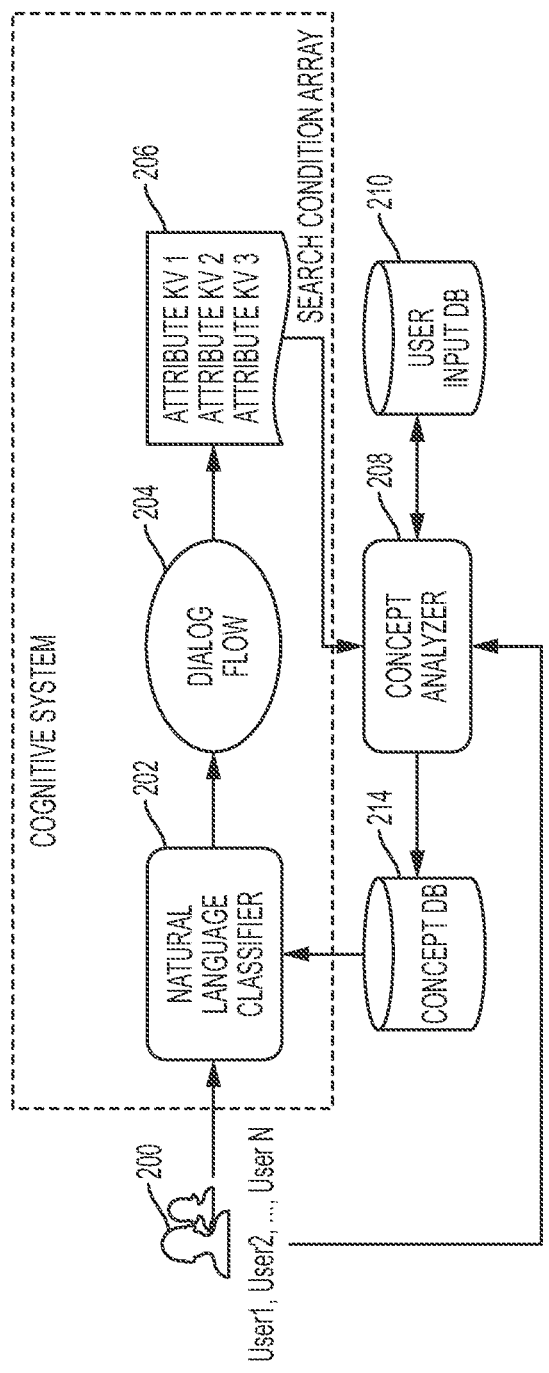
FIG. 2 illustrates a system diagram for executing self-learning software code for extracting concepts for input and mapping the extracted concepts to associated digital search conditions, in accordance with embodiments of the present invention.

FIG. 2 illustrates a system diagram for executing self-learning software code for extracting concepts for input and mapping the extracted concepts to associated digital search conditions, in accordance with embodiments of the present invention. The system diagram illustrates natural language classifier (NLC) code 202, dialog flow code, array code/information 206, concept analyzer component (and code) 208, a user input database 210, and a concept database 214. Concept analyzer component 208 comprises a model for: accepting user natural language input and a search condition array, identifying a concept from the users input, and establishing a general mapping between concepts and corresponding search conditions. Based on the general mapping, concept analyzer component 208 generates a personalized mapping for users. Additionally, concept analyzer component 208 is configured to expand a recognized concept to additional related concepts and generate mappings to search conditions. System 100 enables the following process:
1. A user 200 inputs search intent via natural language.
2. Natural language classifier code 202 identifies a specified search category with respect to the user input.
3. Dialog flow code 204 provides a set of additional questions clarifying exact intent. Each question is associated with a search attribute and an associated the user response corresponds to a specific attribute value.
4. Concept analyzer component 208 uses the user input and search condition array code/information 206 as an input.
5. Concept analyzer component 208 resolves the user input, extracts the concept within the input, and saves the concept with an associated search condition array within user input database 210. Concept analyzer component 208 additionally analyzes all data within user input database 210, identifies signature attributes and corresponding values for each concept thereby forming search conditions for a digital search and recommendation process.
6. Concept database 214 stores the mappings from concept to attributes and values including pre-defined and generated via concept analyzer component 208.
7. All existing concept mappings in concept database 214 enable a cognitive system to retrieve related search conditions when an existing concept is recognized from the user input, thereby simplifying a dialog flow for interacting with a user.

Figure 3:
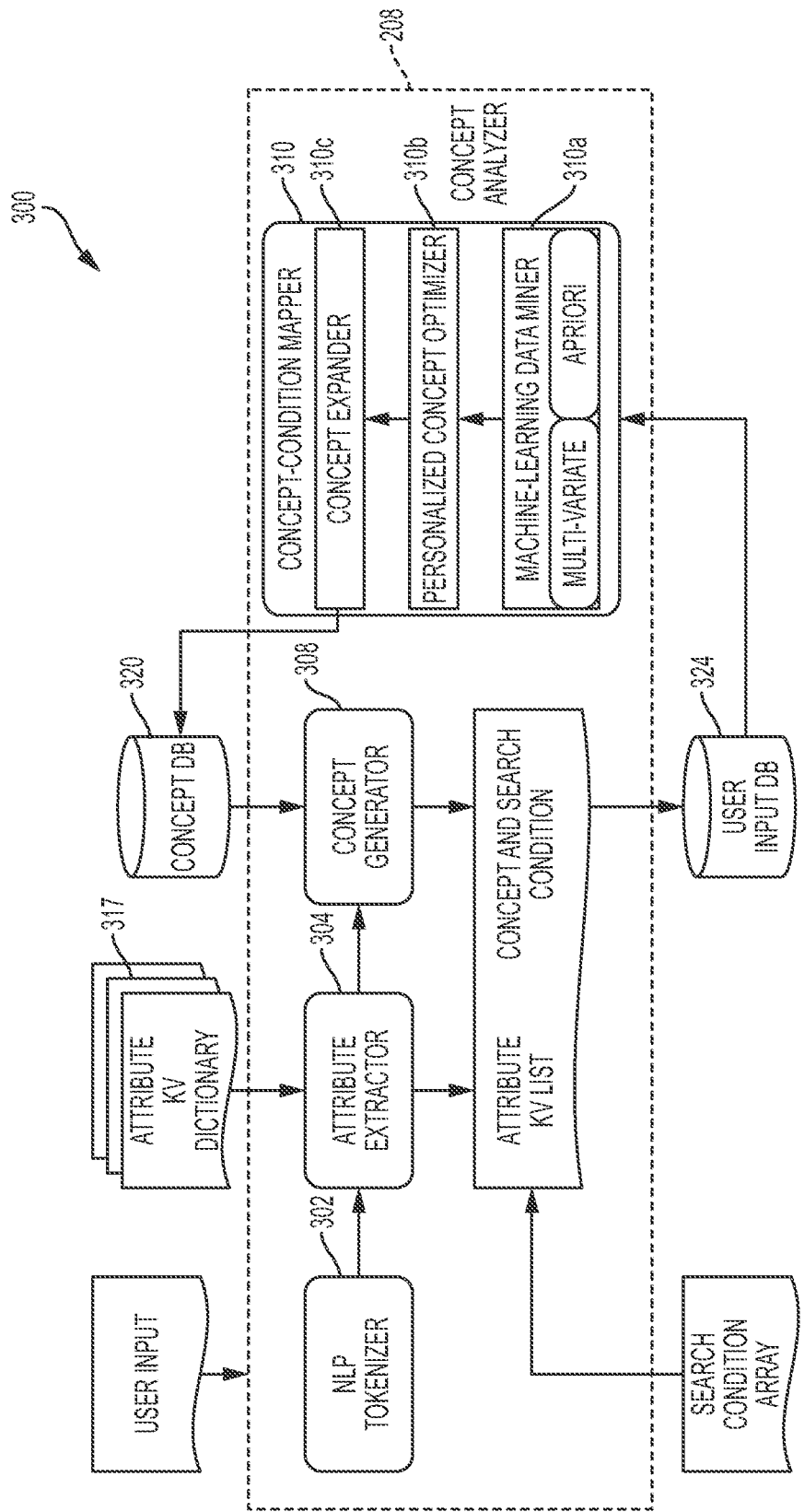
FIG. 3 illustrates an internal view of the concept analyzer component of FIG. 2, in accordance with embodiments of the present invention.

FIG. 3 illustrates an internal view of concept analyzer component 208 of FIG. 2, in accordance with embodiments of the present invention. Concept analyzer component 208 comprises an NLP tokenizer component 302, an attribute extractor component 304, a concept generator component 308, and a concept condition mapper component 310. NLP tokenizer component 302 tokenizes an (e.g., replaces a sensitive data element with a non-sensitive equivalent referred to as a token) input sentence into words and removes stop words, verbs, etc. Attribute extractor component 304: uses tokenized words as attribute values, searches for attribute names (keys) from an attribute KV dictionary database 317 (i.e., grouped by category), and generates an attribute key value list. Concept generator component applies filters to extract a concept. Filters may include:
1. A category name filter for filtering out strings included in a category name.
2. An attribute KV filter for filtering out strings included in an extracted attribute key or value.
3. An existing concept filter for filtering out strings for an existing concept stored in a concept database 320.

All remaining words are considered as a concept requiring mapping to search conditions.

Concept condition mapper comprises analytical software/hardware comprising the following sub modules:
1. A machine-learning data miner component 310a executing machine learning algorithms for mining and analyzing data in user input database 324. Machine-learning data miner component 310a locates general mapping between a specified concept and its potential digital search condition.
2. A personalized concept optimizer 310b for analyzing and optimizing search conditions for a given concept. If a current user is associated with a concept and associated attribute values, personalized concept optimizer 310b optimize the concept's general search condition to a personalized one.
3. A concept expander component 310c for using synonym/antonym analysis to expand a current mapping to more concepts and mappings. For example, an existing mapping of a USB cable comprises: short length <=3 ft. Therefore, concept expander component 310c is configured to generate additional concept mappings such as: long comprises length >3 ft.

Figure 4:
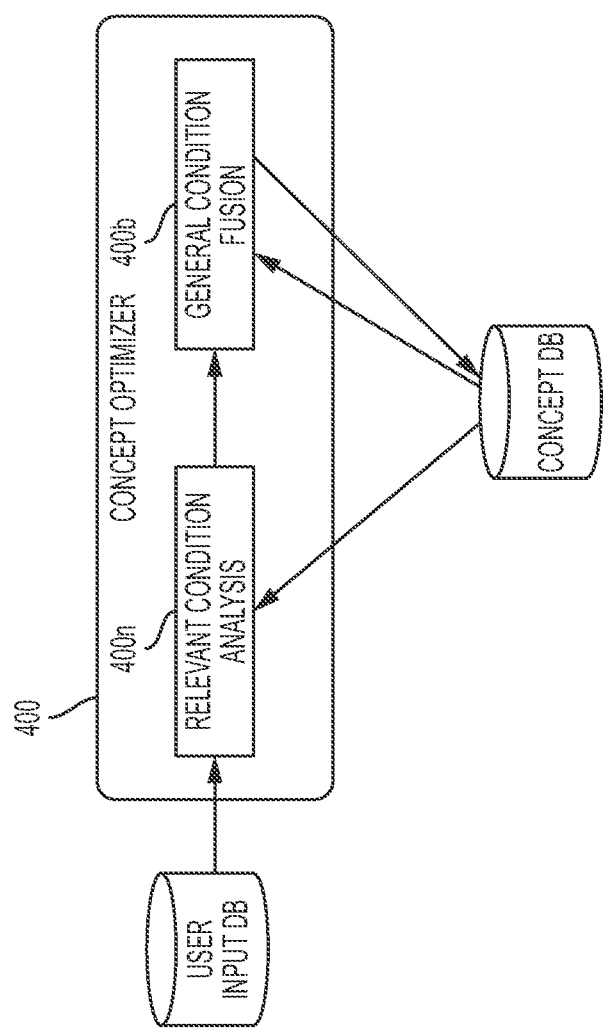
FIG. 4 illustrates a concept optimizer component of the concept analyzer component of FIG. 2, in accordance with embodiments of the present invention

FIG. 4 illustrates a concept optimizer component 400 of concept analyzer component 208 of FIG. 2, in accordance with embodiments of the present invention. Concept optimizer component 400 comprises circuitry and code for executing a general query condition with respect to a specified concept located after executing data miner code. Concept optimizer component 400 analyzes and optimizes search conditions for a given concept. If a current user is associated with a specified concept and associated attribute values, concept optimizer component 400 uses recommend algorithms to locate similar query conditions based on the concept and attribute values. Concept optimizer component 400 comprises a relevant condition analysis component 400a and a general condition component 400b. Relevant condition analysis component 400a executes code comprising a K-nearest neighbor (KNN) to locate several similar query conditions. General condition component 400b fuses a query condition comprising user input attributes, relevant condition attributes, and a general concept query. A priority of associated attributes may include: user input attributes>general concept condition>relevant condition attributes.

Figure 5:
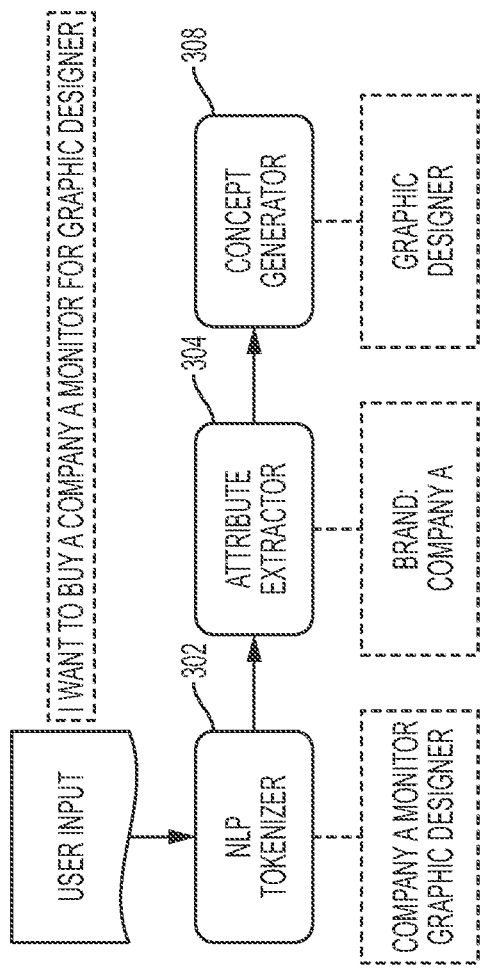
FIG. 5 illustrates an example of a concept extraction process executed by the NLP tokenizer component, attribute extractor component, and concept generator component of FIG. 3, in accordance with embodiments of the present invention.

FIG. 5 illustrates an example of a concept extraction process executed by NLP tokenizer component 302, attribute extractor component 304, and concept generator component 308 of FIG. 3, in accordance with embodiments of the present invention. A concept generator removes (i.e., based on tokenized words) the terms "Monitors" (i.e., a category string) and "company A" included in an attribute KV list. A remaining term "graphic designer" is considered to be a concept string. If the term "graphic designer" is not located in a current concept database, a dialog flow will ask user a few questions to further determine the user's intention. All questions and user answers will be merged together with a previous attribute KV (Brand: company A). The attribute KV list includes potential search conditions for the concept "graphic designer" and a mapping is stored in a user input database for further analysis with a concept analyzer component.

Figure 6:
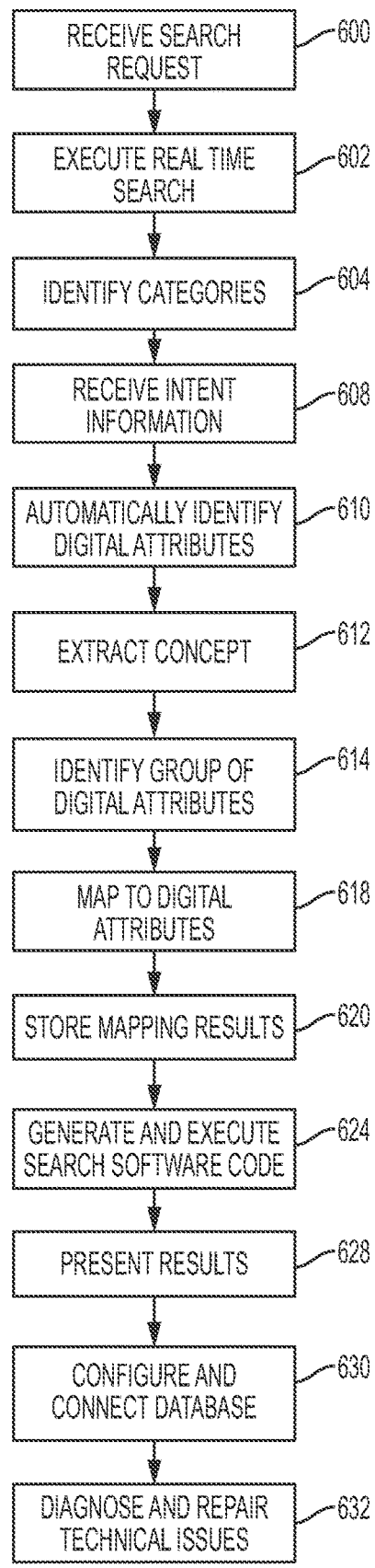
FIG. 6 illustrates an algorithm detailing a process flow enabled by the system of FIG. 1 for improving a real time self-learning database search for digital information resulting in generation of modified search based software code for configuring a database structure, in accordance with embodiments of the present invention.

FIG. 6 illustrates an algorithm detailing a process flow enabled by system 100 of FIG. 1 for improving a real time self-learning database search for digital information resulting in generation of modified search based software code for configuring a database structure, in accordance with embodiments of the present invention. Each of the steps in the algorithm of FIG. 6 may be enabled and executed in any order by a computer processor(s) executing computer code. Additionally, each of the steps in the algorithm of FIG. 6 may be enabled and executed in combination by database server 23, database system 21, and/or hardware device 14 of FIG. 1. In step 600, a natural language Internet search request is received from a user (via a hardware device). In step 602, a real time search is executed (in response to the request of step 600) with respect to a specialized database associated with an Internet based search for specified digital information. In step 604, categories associated with the natural language Internet search request are identified. In step 608, intent based information associated with the natural language Internet search request is received. In step 610, digital attributes of associated digital data identified during the real time search are automatically identified based on the intent based information. Automatically identifying the digital attributes may include:

1. Replacing associated portions of the digital data with digital tokens representing the associated portions.
2. Associating the digital tokens with the digital attributes.
3. Storing the digital tokens within an additional logical partition of the specialized database.
4. Combining the digital tokens with the search based software code.

In step 612, a concept associated with the natural language Internet search request is extracted from the associated digital data. In step 614, a group of digital attributes of the digital attributes is identified in response to the extracting of step 612. In step 618, the concept is mapped to the group of digital attributes. In step 620, the concept mapped to the group of digital attributes is stored within the specialized database. In step 624, search based software code (e.g., natural language processing software code) associated with an Internet search for the specified digital information is generated and executed based on results of the mapping of step 618. In step 628, relevant results associated with the Internet based search for the specified digital information are presented via a specialized graphical user interface. In step 630, the specialized database is configured (based on the relevant results) such that the relevant results are stored within a logical partition of the specialized database. The logical partition is enabled to execute multiple real time Internet searches for the specified digital information. Additionally, the database is automatically connected (via switching circuitry) to additional hardware devices for executing the multiple real time Internet searches for the specified digital information. In step 632, technical issues with the search based software code are automatically diagnosed and repaired.

Figure 7:
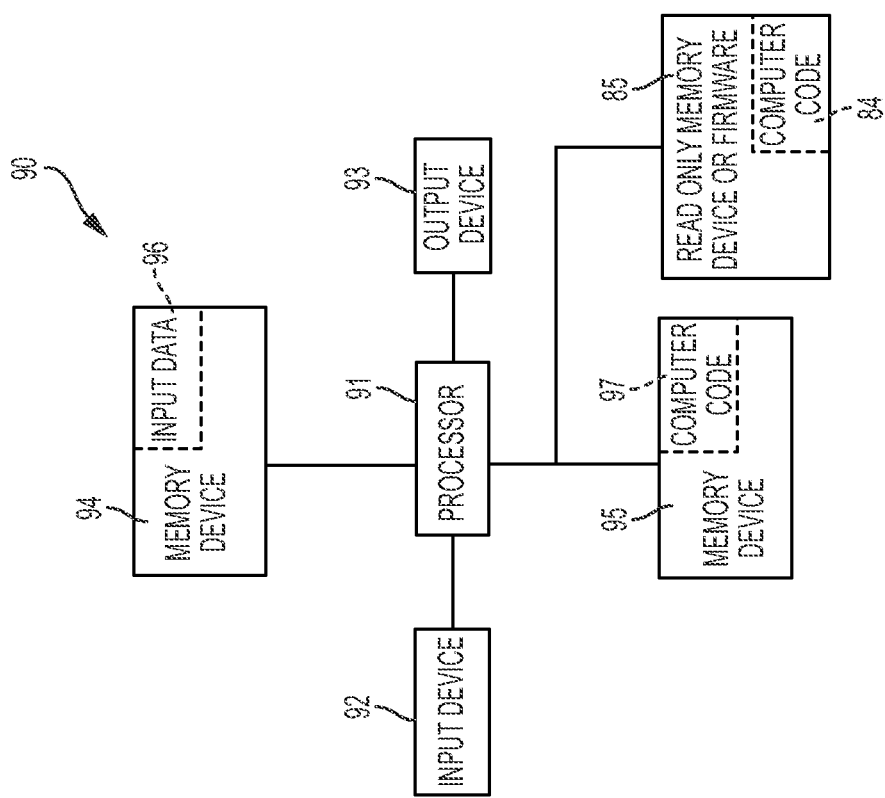
FIG. 7 illustrates a computer system used by the system of FIG. 1 for enabling a process for improving a real time self-learning database search for digital information resulting in generation of modified search based software code for configuring a database structure, in accordance with embodiments of the present invention.

FIG. 7 illustrates a computer system 90 (e.g., database server 23, database system 21, and hardware device 14 of FIG. 1) used by or comprised by the system of FIG. 1 for improving a real time self-learning database search for digital information resulting in generation of modified search based software code for configuring a database structure, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 7 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 6) for improving a real time self-learning database search for digital information resulting in generation of modified search based software code for configuring a database structure. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithm of FIG. 6) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve a real time self-learning database search for digital information resulting in generation of modified search based software code for configuring a database structure. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving a real time self-learning database search for digital information resulting in generation of modified search based software code for configuring a database structure. In another embodiment, the invention provides a business method that performs the process steps of the invention on a subscription, advertising, and/or fee basis. That is, a service supplier, such as a Solution Integrator, could offer to enable a process for improving a real time self-learning database search for digital information resulting in generation of modified search based software code for configuring a database structure. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 7 shows the computer system 90 as a particular configuration of hardware and software, any configuration of hardware and software, as would be known to a person of ordinary skill in the art, may be utilized for the purposes stated supra in conjunction with the particular computer system 90 of FIG. 7. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
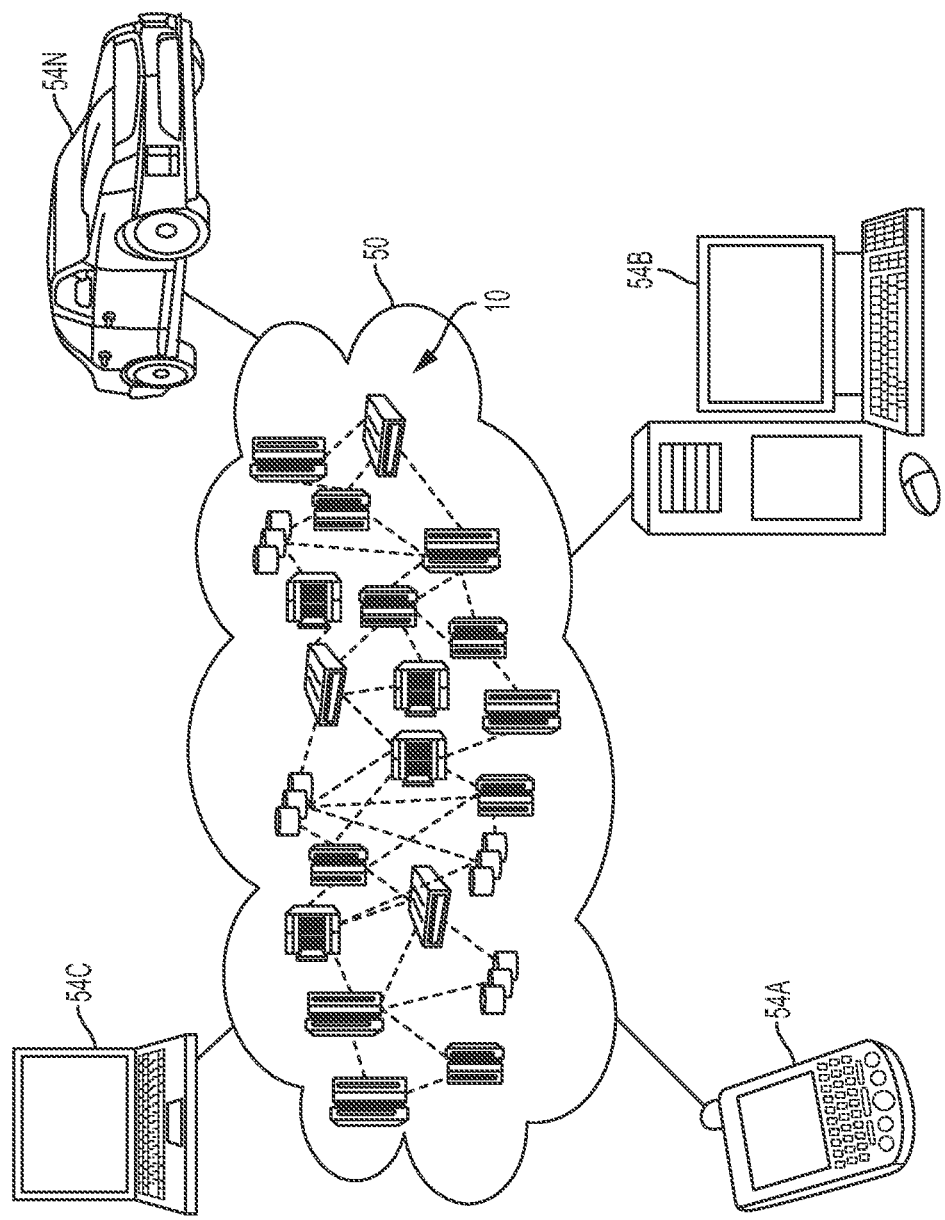
FIG. 8 illustrates a cloud computing environment, in accordance with embodiments of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 8 are intended to be illustrative only and that computing nodes 10 and cloud computing environment 50 can communicate with any type of computerized device over any type of network and/or network addressable connection (e.g., using a web browser).

Figure 9:
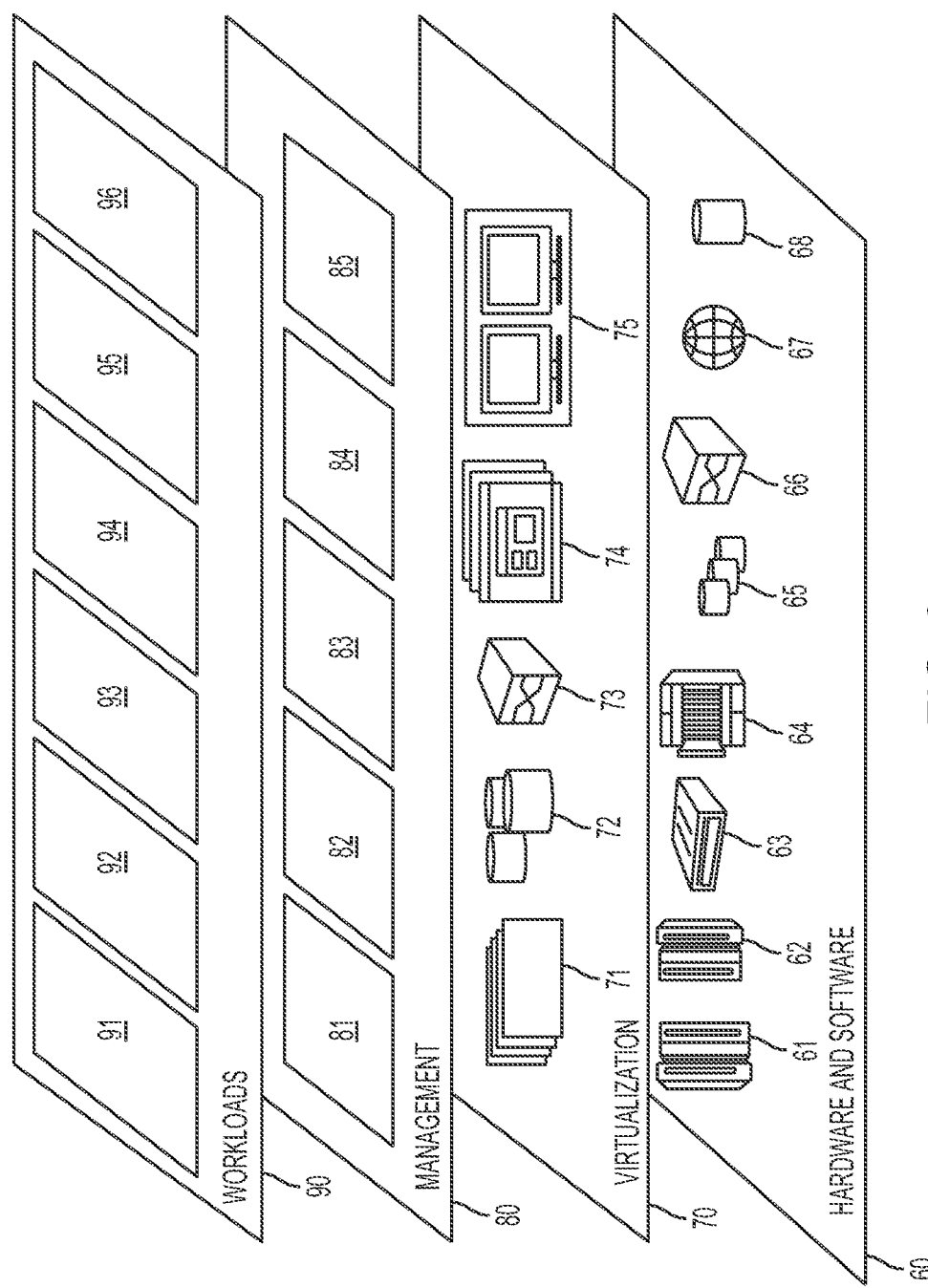
FIG. 9 illustrates a set of functional abstraction layers provided by cloud computing environment, in accordance with embodiments of the present invention.

Referring now to FIG. 9, a set of functional abstraction layers provided by cloud computing environment 50 (see FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 89 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and for improving a real time self-learning database search for digital information resulting in generation of modified search based software code for configuring a database structure 96.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A network search query method comprising:
executing, by a processor in response to a natural language Internet search request of a user, a real time search with respect to a specialized database associated with an Internet based search for specified digital information;
automatically identifying, by said processor based on intent based information associated with said natural language Internet search request, digital attributes of associated digital data identified during said real time search, wherein said automatically identifying said digital attributes comprises:
replacing associated portions of said digital data with digital tokens representing said associated portions; and
associating said digital tokens with said digital attributes;
extracting, by said processor from said associated digital data, a concept associated with said natural language Internet search request;
executing, by said processor, multi-variant analysis code with respect to input logs associated with said real time search;
generating, by said processor based on results of said executing said multi-variant analysis code, search condition arrays associated with said concept;
mapping, by said processor, said concept to a group of digital attributes of said digital attributes;
storing within said specialized database, by said processor, said concept mapped to said group of digital attributes;
generating, by said processor based on said search condition arrays and results of said concept mapped to said group of digital attributes, search based software code associated with an Internet search for said specified digital information;
executing, by said processor in response to a user command, said search based software code;
presenting, by said processor via a specialized graphical user interface, relevant results associated with said Internet based search for said specified digital information;
configuring, by said processor based on said relevant results, said specialized database such that said relevant results are stored within a logical partition of said specialized database, wherein said logical partition is enabled to execute multiple real time Internet searches for said specified digital information;
configuring, by said processor, said specialized database such that said digital tokens are stored within an additional logical partition of said specialized database; and
combining, by said processor, said digital tokens with said search based software code.

2. The method of claim 1, further comprising:
automatically connecting, by said processor via switching circuitry, said database to additional hardware devices for executing said multiple real time Internet searches for said specified digital information.

3. The method of claim 1, wherein said search based software code comprises natural language processing software code.

4. The method of claim 1, further comprising:
automatically diagnosing, by said processor, technical issues with said search based software code; and
automatically repairing, by said processor, said technical issues with said search based software code.

5. The method of claim 1, further comprising:
providing at least one support service for at least one of creating, integrating, hosting, maintaining, and deploying computer-readable code in said processor of a hardware device, said code being executed by said processor to implement: said executing said real time search, said automatically identifying, said extracting, said mapping, said storing, said generating, said executing said search based software code, said presenting, and said configuring.

6. A computer program product, comprising a computer readable storage medium storing a computer readable program code, said computer readable program code comprising an algorithm that when executed by a processor of a hardware device implements a network search query method, said method comprising:

executing, by said processor in response to a natural language Internet search request of a user, a real time search with respect to a specialized database associated with an Internet based search for specified digital information;

automatically identifying, by said processor based on intent based information associated with said natural language Internet search request, digital attributes of associated digital data identified during said real time search, wherein said automatically identifying said digital attributes comprises:

replacing associated portions of said digital data with digital tokens representing said associated portions; and associating said digital tokens with said digital attributes;

extracting, by said processor from said associated digital data, a concept associated with said natural language Internet search request;

executing, by said processor, multi-variant analysis code with respect to input logs associated with said real time search;

generating, by said processor based on results of said executing said multi-variant analysis code, search condition arrays associated with said concept;

mapping, by said processor, said concept to a group of digital attributes of said digital attributes;

storing within said specialized database, by said processor, said concept mapped to said group of digital attributes;

generating, by said processor based on said search condition arrays and results of said concept mapped to said group of digital attributes, search based software code associated with an Internet search for said specified digital information;

executing, by said processor in response to a user command, said search based software code;

presenting, by said processor via a specialized graphical user interface, relevant results associated with said Internet based search for said specified digital information;

configuring, by said processor based on said relevant results, said specialized database such that said relevant results are stored within a logical partition of said specialized database, wherein said logical partition is enabled to execute multiple real time Internet searches for said specified digital information;

configuring, by said processor, said specialized database such that said digital tokens are stored within an additional logical partition of said specialized database; and combining, by said processor, said digital tokens with said search based software code.

7. The computer program product of claim 6, wherein said method further comprises:

automatically connecting, by said processor via switching circuitry, said database to additional hardware devices for executing said multiple real time Internet searches for said specified digital information.

8. The computer program product of claim 6, wherein said search based software code comprises natural language processing software code.

9. The computer program product of claim 6, wherein said method further comprises:

automatically diagnosing, by said processor, technical issues with said search based software code; and automatically repairing, by said processor, said technical issues with said search based software code.

10. A hardware device comprising a processor coupled to a computer-readable memory unit, said memory unit comprising instructions that when executed by said processor implements a network search query method comprising:

executing, by said processor in response to a natural language Internet search request of a user, a real time search with respect to a specialized database associated with an Internet based search for specified digital information;

automatically identifying, by said processor based on intent based information associated with said natural language Internet search request, digital attributes of associated digital data identified during said real time search, wherein said automatically identifying said digital attributes comprises:

replacing associated portions of said digital data with digital tokens representing said associated portions; and associating said digital tokens with said digital attributes;

extracting, by said processor from said associated digital data, a concept associated with said natural language Internet search request;

executing, by said processor, multi-variant analysis code with respect to input logs associated with said real time search;

generating, by said processor based on results of said executing said multi-variant analysis code, search condition arrays associated with said concept;

mapping, by said processor, said concept to a group of digital attributes of said digital attributes;

storing within said specialized database, by said processor, said concept mapped to said group of digital attributes;

generating, by said processor based on said search condition arrays and results of said concept mapped to said group of digital attributes, search based software code associated with an Internet search for said specified digital information;

executing, by said processor in response to a user command, said search based software code;

presenting, by said processor via a specialized graphical user interface, relevant results associated with said Internet based search for said specified digital information;

configuring, by said processor based on said relevant results, said specialized database such that said relevant results are stored within a logical partition of said specialized database, wherein said logical partition is enabled to execute multiple real time Internet searches for said specified digital information;

configuring, by said processor, said specialized database such that said digital tokens are stored within an additional logical partition of said specialized database; and combining, by said processor, said digital tokens with said search based software code.

11. The hardware device of claim 10, wherein said method further comprises:

automatically connecting, by said processor via switching circuitry, said database to additional hardware devices for executing said multiple real time Internet searches for said specified digital information.

12. The hardware device of claim 10, wherein said search based software code comprises natural language processing software code.

13. The hardware device of claim 10, wherein said method further comprises:
- automatically diagnosing, by said processor, technical issues with said search based software code; and
- automatically repairing, by said processor, said technical issues with said search based software code.

\* \* \* \* \*